May 4, 1965  D. C. LEARY, JR  3,181,438
METHOD AND APPARATUS FOR MAKING TEAR STRIP
POUCH TYPE CONTAINERS
Original Filed Aug. 23, 1957  5 Sheets-Sheet 1

INVENTOR.
DANIEL C. LEARY, JR.
BY *Stanley Bialos*
Attorney

INVENTOR.
DANIEL C. LEARY, JR.
BY Stanley Bialos
Attorney

United States Patent Office 3,181,438
Patented May 4, 1965

3,181,438
METHOD AND APPARATUS FOR MAKING TEAR STRIP POUCH TYPE CONTAINERS
Daniel C. Leary, Jr., Portland, Oreg., assignor to Crown Zellerbach Corporation, San Francisco, Calif., a corporation of Nevada
Original application Aug. 23, 1957, Ser. No. 679,829, now Patent No. 3,057,539, dated Oct. 9, 1962. Divided and this application Jan. 11, 1962, Ser. No. 171,549
8 Claims. (Cl. 93—8)

This application is a division of application Serial No. 679,829 filed August 23, 1957, Patent No. 3,057,539, patented October 9, 1962.

This invention relates to pouch type containers which are readily heat sealable and which incorporate a tear strip along at least one edge thereof to allow such containers to be rapidly opened and the contents thereof easily removed. The invention also relates to the method of making such heat sealable tear strip containers and the apparatus utilized in carrying out such method.

Substantially flat heat sealable containers of the pouch type are particularly well adapted for packaging powdery materials. Such powdery materials often include cocoa, hot chocolate, instant coffee, powdered milk and like products intended for human consumption. The effective use of such pouch type containers is not limited to the packaging of powdery materials, however, and such containers also are well suited for packaging bulk type products such as raisins, peanuts and the like.

While products of the type mentioned have been packaged in pouch type containers heretofore such prior art containers frequently were difficult to open and the products could not be removed easily from the containers. Furthermore, such prior art containers often required the application of some type of adhesive material to secure the container closed. Not infrequently during application such adhesive would inadvertently come in contact with the packaged product thereby rendering such product undesirable to the ultimate consumer.

Summarizing this invention, it includes the provision of flexible, substantially flat pouch type containers which possess inner heat sealable moisture resistant surfaces, which surfaces desirably are moisture impermeable, whereby the containers may be rapidly and easily sealed to retain the contents therein, thereby precluding the need for the application of separate adhesive material to seal the containers. In addition, the invention includes the provision of a pull cord or tear strip of appropriate material bonded throughout its length to each of the pouches embodying this invention, desirably in the direction of an edge of such pouch, thereby providing means to open rapidly such pouch along the entire length of an edge thereof or along any desired portion of such edge.

By utilizing pouches of this invention, the shortcomings of the prior art are overcome in that pouch type containers of the type here involved readily and easily may be formed and sealed and yet the containers may be rapidly and easily opened by the ultimate consumer for removal of the product therefrom.

The invention also involves the method of forming and producing pouch type containers embodying the invention as well as the apparatus utilized in carrying out such method. Generally, the apparatus includes supply means which provides a supply of flexible sheet material to which a coating of appropriate heat sealable material is applied thereby imparting heat sealable characteristics to the completed pouches. The apparatus also includes supply and feeder means for providing a continuous supply of one or more pull cords or tear strips for application to the elongated sheet of material to which the heat sealable material is applied. Additional means incorporated in the apparatus includes oscillating mechanism for altering the position of the tear strips as they are applied to the sheet, pressure means to insure proper adherence of the tear strips and the heat sealable material to the sheet and cutter means for dividing the coated sheet into appropriate widths for the manufacture of individual heat sealable pouches.

Reference is now made to the drawings for a more detailed description of the invention in which.

Figures 1, 2, 3, 4, 5, 7:
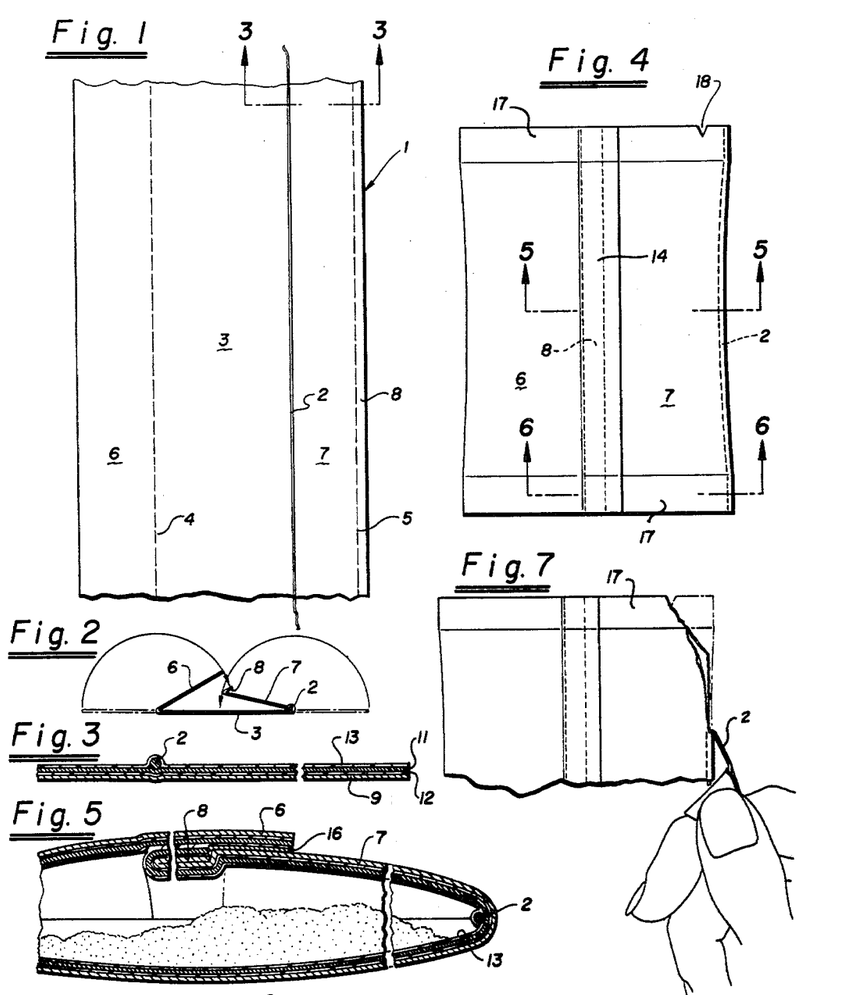
FIG. 1 is a plan view of an elongated sheet of material showing a tear strip applied thereto throughout the length thereof.
FIG. 2 is an end view of the sheet of FIG. 1 showing the manner in which such sheet is folded in forming one desirable embodiment of a heat sealable pouch.
FIG. 3 is a sectional view taken in the plane of line 3—3 of FIG. 1 which shows the various laminated layers which comprise a coated sheet and which further illustrates a tear strip bonded to the sheet. This figure is on an enlarged scale relative to FIG. 1.
FIG. 4 is a plan view of one desirable embodiment of a pouch filled with material showing the extremities thereof sealed and illustrating the tear strip running along one edge.
FIG. 5 is a sectional view taken in the plane of line 5—5 of FIG. 4 showing a heat sealed pouch containing a quantity of powdery material and illustrating the manner in which the central seam of such pouch is constructed.
FIG. 7 is a partial plan view similar to FIG. 4 of a filled pouch illustrating the manner in which the tear strip is utilized for opening the pouch.

Referring now to a desirable embodiment of a pouch incorporating this invention, FIG. 1 shows an elongated sheet of flexible material 1 to which a layer of heat sealable material which desirably is non-tacky at normal temperatures has been applied in a manner which will be described hereinafter. Bonded throughout its length to the sheet of material 1 is an elongated, relatively thin pull cord or tear strip 2, which desirably is in the form of a fine cord or thread. Such thread may be made of any suitable material, such as cotton, Dacron, nylon, linen, glass fiber or the like.

Under certain situations, it may be desirable to impregnate or coat the tear strip 2 with a heat sealable material of the same type as is used to coat sheet 1. Such impregnation or coating of the tear strip 2 aids in the proper sealing of the seams of a pouch and also precludes any undesirable material which may be present in the tear strip from contacting the product in the pouch. Such treatment of the tear string is not necessary under all conditions however.

The laminated sheet illustrated in FIG. 1 consists of a central panel 3 bordered by fold line 4 and tear strip 2. On the outer edge of panel 3 and hingedly connected thereto along line 4 is panel 6. Hingedly connected to the opposite edge of panel 3 is panel 7, to the outer margin of which is connected relatively narrow panel 8. Panel 8 is hingedly connected to panel 7 along fold line 5. The sheet shown in FIG. 1 is of a length greater than the normal length of a completed pouch and it should be understood that such sheet is cut into short lengths to form individual pouches of a predetermined size.

Individual tubular pouches are formed by folding the sheet of FIG. 1 along fold line 4 and also along a line underlying tear strip 2 to the position shown in FIG. 2. The dotted lines 4 and 5 indicated in FIG. 1 are used for illustrative purposes only and need not be actual crease lines formed in the sheet 1, but it is contemplated that such crease lines may be formed in the sheet if so desired. After the sheet 1 has been folded to the position illustrated in FIG. 2, panels 6 and 7, which lie on the outer sides of line 4 and tear strip 2, respectively, are brought into partially overlapping contacting relationship. To insure proper sealing of a subsequently filled pouch, it is desirable that panel 7 of the sheet 1 has an outer portion thereof reversely folded along line 5 to provide the relatively narrow panel 8. In this manner, two heat sealable surfaces, as will be discussed hereinafter, are brought into contact with each other. Panel 6 is then folded flat over reversely folded panel 8 with the edge thereof extending beyond the edge of panel 8 to overlie a portion of panel 7 (see FIGS. 5 and 6).

Taking reference to FIG. 3, it should be understood that the sheet of FIG. 1 desirably, but not necessarily, is composed of several separate webs of material laminated together. In the illustrated embodiment, sheet 1 consists of a parent web of flexible paper material or the like 9 to which is securely bonded throughout its length and width a relatively thin sheet of metallic foil 11 by means of a layer of any suitable laminating material 12. It should be understood that the laminating material used may vary depending on the particular desires of the manufacturer. Such laminating material may be wax, an appropriate adhesive or a suitable heat sealable material, such as polyethylene. In the embodiment illustrated, polyethylene has been found to be a desirable laminating material.

To the outer surface of metallic foil web 11 is applied a relatively thin coating of heat sealable moisture resistant material 13 which desirably is moisture impermeable. Desirably such heat sealable material is polyethylene, but it should be understood that any other commercially available heat sealable material which is non-tacky at normal temperature but which becomes tacky upon the application of heat could be utilized if desired without departing from the scope of this invention.

Securely bonded to the sheet 1 throughout its length is the relatively small tear strip 2 mentioned previously. In the embodiment illustrated, tear strip 2 is securely bonded to the laminated sheet by means of the coating of heat sealable material 13 applied thereto. That is, the heat sealable coating 13 performs the dual function of providing means whereby the subsequently formed pouches may be readily heat sealed and also provides means by which the tear strip may be secured to the elongated sheet from which such pouches subsequently are formed.

It should be understood that the desirable embodiment of the sealed pouches are relatively small. Generally, but not necessarily, filled pouches are only slightly larger than the pouch illustrated in FIG. 4. FIG. 4 illustrates a heat sealable pouch formed from the sheet of FIG. 1 which had been filled with a predetermined amount of powdery material, such as cocoa or the like, intended for human consumption. When unfilled, the pouches are in substantially flat tubular form but when a quantity of material is loaded therein, the body portion of the pouch bows or bulges outwardly, thereby causing the side edges to bow inwardly, as shown in FIG. 4.

Referring again to FIG. 2, it should be noted that the central panel 3 forms one wall of the completed pouch while panels 6 and 7 overlie such panel 3 and, along with reversely folded panel 8, cooperate to form the other wall of the pouch. In this manner a substantially flat pouch comprising two walls connected along folded edges is provided. It should be understood that the length of such pouch may vary depending on the particular needs of the manufacturer and the sheet of FIG. 1 accordingly will be cut to any predetermined length to provide a pouch of the size desired.

It should be apparent from FIG. 2 that as panel 8 is reversely bent along line 5 and panel 6 is folded thereover, that two heat sealable surfaces are brought into face-to-face contact. By applying heat in any conventional manner to the outer face of panel 6 in the area overlying panel 8, the heat sealable material thereon softens and a heat sealed seam is provided upon the removal of heat and subsequent hardening of the heat sealable material, which seam extends across a face of the flat pouch between opposite extremities thereof, as is illustrated at 14 in FIG. 4. In such manner, the pouch is formed into tubular form for subsequent filling and sealing. It should also be noted, however, that if desired, heat may be applied to both the outer surfaces of panel 6 and panel 8 thereby providing an upstanding heat sealed seam which subsequently is folded flat against panel 7 to provide a flat tubular pouch.

Figure 6:
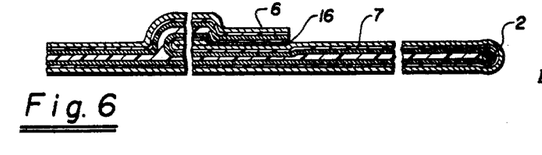
FIG. 6 is a section taken in the plane of line 6—6 of FIG. 4 illustrating the construction of a fin type seam which is formed at an extremity of a sealed pouch.

It will be noted that a portion of panel 6 extends beyond the edge of panel 8, as is illustrated in FIGS. 5 and 6, as seam 14 is folded against panel 7. Such extending portion of panel 6, after being folded flat against panel 7 of the pouch, desirably is secured in place by a layer of adhesive material 16 which desirably is applied to the undersurface of such panel extension. Also, the extension of panel 6 may be secured to the face of the pouch panel 7 merely by heat sealing such panel extension thereto as the overlapping faces of panels 6 and 8 are heat sealed in the manner mentioned previously. In such case, the adhesive layer 16 will be unnecessary in that the heat sealable surface 13 of panel 6 would function to secure the extension of panel 6 to the pouch face.

Seam 14, formed by the overlapping heat sealed panels 6 and 8, is maintained in flattened condition across the face of the pouch by either of the desirable methods mentioned previously. Under certain other conditions, however, it may be unnecessary to secure the seam 14 to the face of the pouch. In such case it will suffice if seam 14 merely is folded flat against the face of the pouch without being secured thereto.

At each extremity, as shown in FIG. 4, the pouch illustrated is heat sealed to provide substantially flat fin-type seams 17. Such fin-type seams are formed by applying conventional heat sealing apparatus to the ends of the tube formed when seam 14 is produced by overlapping panels 6, 7 and 8 in the manner described. Because of the contacting face-to-face relationships of the opposite walls of the tube and the heat sealable coating applied to each of such walls, the extremities 17 of the pouch may readily be heat sealed after the appropriate amount of product has been filled therein.

It should be understood that it is contemplated that the application of a coating of heat sealable material to an elongated sheet, the application of a tear strip to such sheet, the cutting and folding of such sheet into pouches, and the filling and sealing of the pouches so formed may be one continuous rapid operation of the type to be discussed subsequently. In addition, all of the above steps may be performed as a plurality of independent operations which may be combined to produce a plurality of filled and sealed pouches. The exact sequence of operation, it should be noted, may vary depending on the requirements and manufacturing facilities of a particular pouch manufacturer.

As illustrated in FIGS. 4 through 7, an appropriate tear strip 2 is bonded adjacent the inner surface of the pouch by means of the heat sealable coating 13. Such tear strip in the completed pouch extends adjacent one of the folded edges of the pouch, desirably the right hand edge, where it may be grasped for rapid opening of the pouch.

It should be noted that the tear strip 2 extends between opposite extremities of the pouch and has each of its end portions heat sealed and clamped in one of the fin-type seams 17, which seams extend a substantial distance inwardly from such extremities. Because a plurality of individual blanks for forming pouches are cut from an elongated parent sheet of material of the type shown in FIG. 1, the tear strips 2 do not extend beyond the opposite extremities of the completed pouch. That is, the ends of the tear strips 2 desirably terminate flush, or substantially so, with opposite extremities of the pouch.

Because of the pouch tear strip construction it is a simple matter to open a pouch along the entire edge thereof merely by grasping one of the fin-type seams 17 adjacent a corner thereof and, by tearing downwardly through such seam toward the edge of the pouch, to pull the tear strip through the wall of the pouch at the edge thereof. To facilitate initial tearing of the seam 17 of the pouch, in that the material used to form the pouch is often quite tough, a small nick or V-shaped notch 18 may be provided adjacent one corner thereof. In addition, to indicate the location of the tear strip along the edge of the pouch, appropriate printed matter may be supplied on each filled pouch to indicate the manner of opening and the direction in which the tear strip extends. It should be understood that a notch and appropriate printed matter may be incorporated in each type of pouch discussed hereinafter.

As illustrated in FIG. 7, by grasping one corner of a fin of the pouch and tearing downwardly thereon one end of the bonded tear strip automatically is pulled with the corner of the pouch so torn. Because the tear strip 2 is securely bonded throughout its length to the pouch, and the end portions thereof are securely clamped in the heat sealed fins 17, it is not possible for the tear strip to be pulled out of the pouch without tearing the pouch along the edge thereof. That is, the tear strip is precluded from separation from the pouch without tearing the wall of the same. In this manner the pouch may be rapidly opened merely by pulling downwardly as indicated in the drawings.

It should be understood that because the tear strip extends between opposite extremities of the pouch, the pouch can be opened along the entire length of an edge thereof so that the contents of the pouch may be rapidly emptied from the pouch through the opened edge thereof. However, should it be desired to open only a portion or corner of the pouch, thereby providing a limited opening through which the contents of the pouch may be poured into a small container or the like, it is possible to pull the tear strip only a portion of the way along the edge of the pouch thereby controlling the size of the opening produced.

In this manner, depending on the particular contents of the pouch, the contents may be rapidly removed whether they are powdery materials which require only a small opening for removal or whether they are bulky materials which require an opening along substantially the entire edge of the pouch for removal. As mentioned previously, pouches of the instant invention are well suited for packaging powdery materials as well as bulky solid type materials.

In the embodiment of the pouch illustrated in FIGS. 4 through 7, it will be noted that the tear strip 2 is applied directly to one surface of the metallic foil web 11 and the coating of heat sealable material 13 is applied over the entire metallic foil web 11 and the tear strip 2. In this manner the tear strip is securely bonded to the laminated sheet 1 by means of the heat sealable coating 13.

When the laminated sheet is formed into a pouch, the tear strip 2 lies outwardly of the heat sealable coating 13, as is illustrated in FIG. 5. Therefore, when the tear strip is utilized to open the pouch, because such strip lies outwardly of the heat sealable layer 13, the pouch is not completely opened in that the thin layer of heat sealable material has not been severed when the tear string was pulled downwardly through the edge of the pouch. Because the heat sealable layer 13 was not severed, the pouch illustrated may be opened in a controlled manner.

The concept of controlled opening of pouches is desirable when the pouches are filled with powdery material in that there can be no inadvertent spilling of the material as the tear strip is utilized. The thin unbroken inner layer of heat sealable material 13 confines the powdery material therein as the tear strip 2 is utilized. However, because the heat sealable layer is quite thin, it is a simple matter, after the tear string has been pulled along the pouch edge to the desired extent, to separate the thin heat sealable layer with the fingers, to allow removal of the contents from the pouch.

Another modification may be utilized for applying the tear strip 2 to the laminated sheet 1 which differs from the modification just mentioned. In such modification the tear strip may be applied between the paper web 9 and the thin metallic foil web 11. In such modification the tear strip will not open the pouch completely and it is necessary for the consumer to separate the inner heat sealable layer 13 as well as the foil web 11. Under certain conditions, however, this additional operation may be desirable, and in view of the fact that the foil web 11 is quite thin, it remains a simple matter to complete opening of the pouch with the fingers. In this modification of the pouch, the controlled opening concept is more pronounced in that two layers of the laminated wall of the pouch must be separated after the tear strip has been utilized. All inadvertent spilling of the pouch contents is precluded in this embodiment.

As will be discussed hereinafter, if it is so desired, the tear strip may be applied to the outer surface of the layer of heat sealable material 13 so that the pouch may be opened completely merely by pulling the tear strip through the wall of the pouch including heat sealable layer 13. In such embodiment the controlled opening of the pouch is eliminated.

Figures 8, 9, 10, 11:
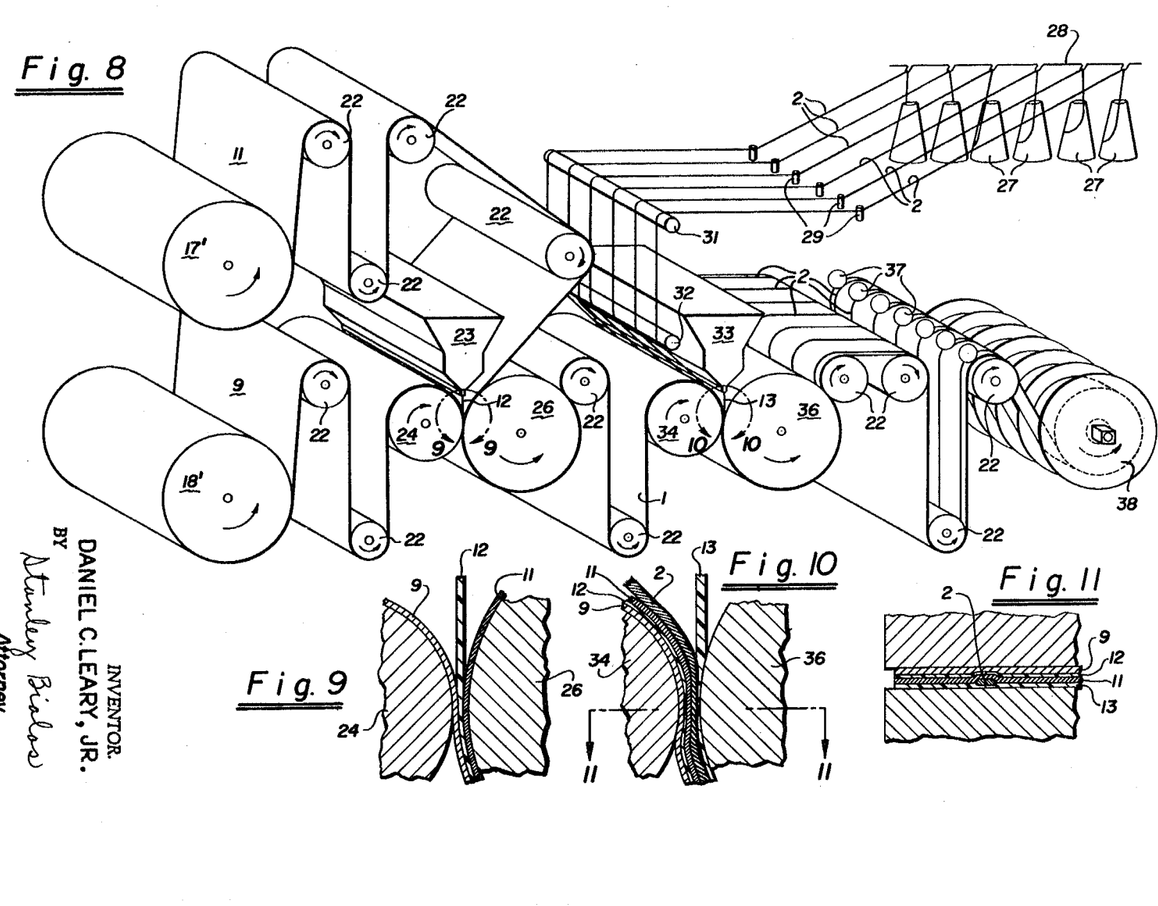
FIG. 8 is a schematic view of one embodiment of the apparatus utilized in making tear strip pouches.
FIG. 9 is a partial vertical section taken in the plane of line 9—9 of FIG. 8 illustrating the bonding together of two webs of flexible material to form a laminated sheet.
FIG. 10 is a partial vertical section taken in the plane of line 10—10 of FIG. 8 illustrating one desirable embodiment of the manner in which a tear strip and coating of heat sealable material are applied to a laminated sheet.
FIG. 11 is a sectional view taken in the plane of line 11—11 of FIG. 10 showing the construction of the laminated sheet of FIG. 10 with a tear strip bonded thereto.

Referring now to FIG. 8, a desirable apparatus which may be utilized in making heat sealable pouches is schematically illustrated and includes supply means for providing a plurality of flexible webs to be laminated together. Such supply means consists of supply rolls 17' and 18' from which are drawn desirably a metallic foil web 11 and a paper web 9. The foil and paper webs 11 and 9 pass over a series of conventional idler rollers 22 and subsequently are fed beneath a laminating material applicator 23. The applicator 23 may be of a conventional type and its purpose is to apply a thin even coating of laminating material, such as adhesive, heated wax or heated polyethylene, between the two webs 9 and 11 carried thereunder.

In this respect, it should be understood that while the invention is described as embodying only two webs of flexible sheet material, more than two webs could be utilized. To modify the apparatus illustrated to form laminated sheets of more than two webs, it only would be necessary to insert an additional web supply roll and an additional laminating material applicator into the system for each additional web to be laminated in to the finished sheet.

Positioned beneath the applicator 23 is pressure means in the form of two large rolls 24 and 26. Each of the rolls 24 and 26 is rotated, in the direction of the arrows, towards the other, thereby drawing the webs 9 and 11 from beneath the applicator 23. In so doing the rolls 24 and 26 subject webs 9 and 11 to substantial pressure which causes the laminating material 12 to securely bond the webs together into a laminated sheet 1. The bonding of webs 9 and 11 together between rolls 24 and 26 is illustrated in FIG. 9. After the laminated sheet is securely bonded in the manner described, it passes over additional idler rollers 22 to the location in which the tear strips and heat sealable material are applied thereto.

It should be understood that, depending on the width of the laminated sheet, any predetermined number of tear strips 2 may be applied simultaneously throughout the length of the laminated sheet 1. To facilitate the application of a plurality of tear strips to such a sheet, supply means is utilized which desirably comprises a plurality of spools 27 positioned adjacent the apparatus from which the tear strips 2 are pulled. The strips 2 pass from spools 27 over feeder means desirably in the form of a guide bar 28 and from the guide bar 28 over a plurality of spacer guides 29 which are arranged to guide the tear strips 2 onto a guide rod 31 supported above the apparatus in any conventional manner. Guide rod 31 is formed with an appropriate notched surface, in each individual spaced notch of which a separate tear strip is guided thereby precluding any transverse movement or misalignment of the tear strips as they pass over rod 31. From the rod 31 the tear strips pass over a second guide rod 32 which is desirably positioned below guide rod 31 and above the laminated sheet 1 discussed previously. Guide rod 32 also is provided with a notched surface to prevent transverse movement and misalignment of the tear strips as the same pass thereover.

Adjacent guide rod 32 means for applying a coating of heat sealable material to one surface of the laminated sheet 1 is positioned. Such means desirably is in the form of a machine 33 which applies, desirably by extrusion, a thin layer or coating 13 of heat sealable material, such as polyethylene, over the entire surface of the laminated sheet 1 passing therebeneath. Extruder 33 applies such a coating to the laminated sheet at elevated temperatures. The type of extruder used is a matter of choice in that certain commercial models presently are available. It should be understood that extruder 33 desirably applies a viscous soft coating of polyethylene to the laminated sheet which subsequently dries to a nontacky heat sealable layer or coating at normal temperatures. Because such coating is extruded from extruder 33 under heat the polyethylene adheres to the laminated sheet as the coating dries at lower temperatures, thereby precluding the need for separate adhesives to secure the heat sealable coating to the laminated sheet.

It should be noted that due to the arrangement of guide rod 32 relative to extruder 33 the plurality of tear strips 2 are applied directly to one surface of the laminated sheet 1 and the coating of heat sealable material 13 is extruded over the tear strips onto the surface of the sheet thereby securely bonding the tear strips throughout their length to the laminated sheet. This arrangement of the tear strip bonded to the laminated sheet on the outer surface of foil web 11 is the modification illustrated on an enlarged scale in FIG. 3 and FIG. 10. As the heat sealable material layer 13 is released from the extruder 33, it is positioned on the outer face of the laminated sheet 1 directly onto the foil web 11 thereof thereby covering the tear strips 2 which have been positioned on foil web 11 by the feeder means described previously.

In the embodiment illustrated, desirably each of the tear strips 2 originally is of substantially round cross section. Positioned directly beneath extruder 33 is pressure means in the form of a second pair of pressure rolls 34, 36. Rolls 34 and 36 rotate towards each other and thereby draw the laminated sheet 1 with the tear strips 2 and the heat sealable coating thereon downwardly from beneath the extruder 33. Rolls 34 and 36 apply pressure to the coated sheet and thereby securely bond the heat sealable coating 13 thereto and also bond the tear strips 2 throughout their length by means of such heat sealable coating to the sheet.

Because of the substantial pressure applied to the coated sheet by rolls 34 and 36 the tear strips 2 are somewhat flattened, depending upon the material from which they are formed, as illustrated in FIG. 11. It should be noted that such flattened tear strips 2 are bonded securely to the laminated sheet 1 and are partially embedded in the heat sealable coating 13. Because the rolls 34 and 36 draw the laminated sheet and the tear strip therewith downwardly beneath the extruder 33, it is unnecessary to provide any mechanical means for physically feeding the tear strips to the laminated sheet. The tear strips automatically are drawn into position between the foil web 11, and the heat sealable layer 13 as the sheet and the heat sealable layer are drawn between the rolls 34 and 36. However, in certain situations it may be desirable to feed mechanically the tear strips to the laminated sheet and such mechanical feeding also is contemplated as being part of this invention.

In the embodiment of the apparatus shown in FIG. 8, the plurality of tear strips 2 are applied to the laminated sheet in substantially straight lines along the length of such sheet. After passing through the rolls 34 and 36 the sheet, with the tear strips and heat sealable coating thereon, passes over additional idler rollers 22 and subsequently passes beneath a plurality of cutters 37. It will be noted that each of such cutters 37 is arranged in spaced relationship relative to the other cutters so that wide laminated sheet 1 is cut into a plurality of separate sheets of less width as such sheet passes beneath the cutters. One of such narrow sheets has been illustrated in FIG. 1 and discussed previously. Each of such narrow sheets includes at least one elongated tear strip 2 running throughout the length thereof.

After sheet 1 has been cut into a plurality of separate sheets each of such separate sheets is coiled into roll form on appropriate take-up roll means 38. It should be understood, however, that cutting of the laminated and coated sheet 1 into separate sheets of less width may be deferred until some later time and, if desired, such wide laminated sheet 1 initially may be coiled into one large roll prior to such cutting. The time at which sheet 1 is cut into smaller sheets may be varied depending on the production arrangement and facilities of a particular manufacturer.

It should be understood, however, that the entire process mentioned previously may be a continuous process followed by automatic formation of individual pouches on appropriate machines, filling such pouches with product and heat sealing the same. Also, if desired, the sheets may be cut into small blanks each of which is intended to form a single pouch. Such blanks subsequently may be filled individually and sealed. If it is desirable to sell the laminated sheet in roll form or in sheet form or in the form of individual blanks each of which is adapted to receive a quantity of material the manufacturing process may be modified accordingly to produce any of the above mentioned products for subsequent sale.

Figures 12, 13, 14, 15:
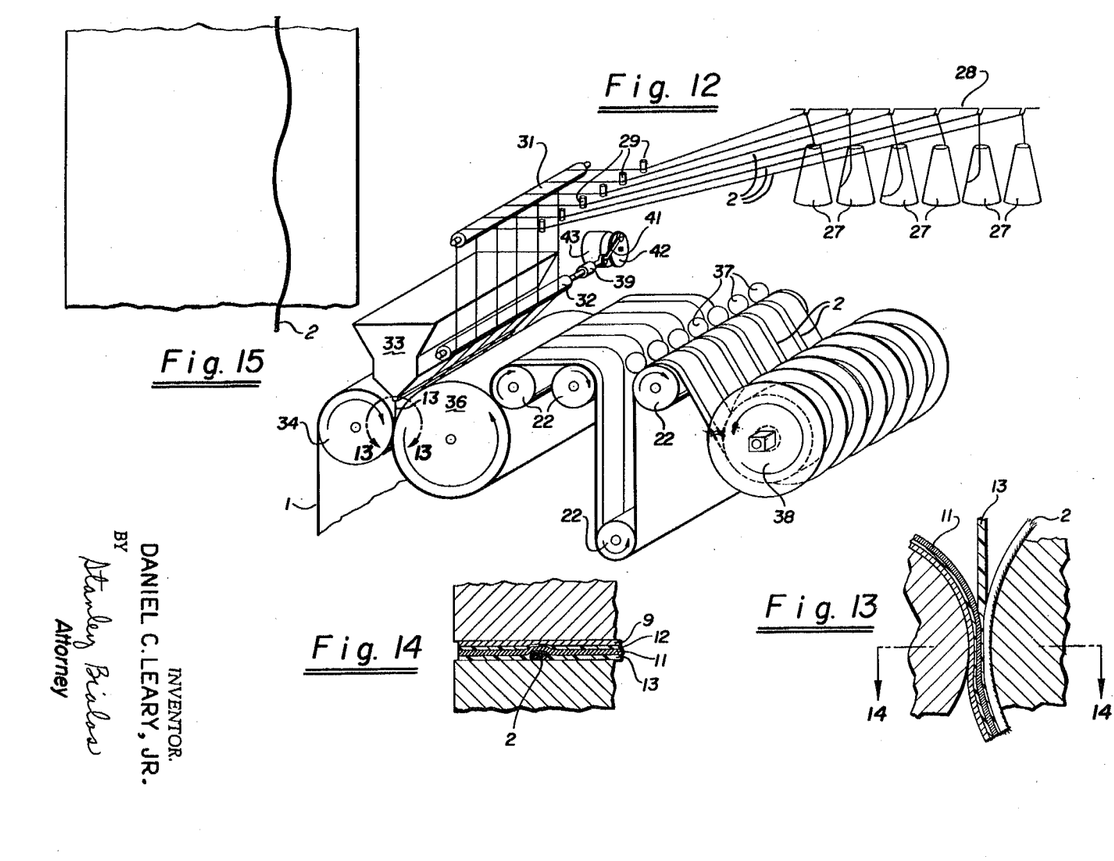
FIG. 12 is a schematic view of a portion of a modification of the apparatus utilized in forming tear strip pouches.
FIG. 13 is a partial vertical section taken in the plane of line 13—13 of FIG. 12 illustrating another manner of applying a tear strip and a coating of heat sealable material to a laminated sheet.
FIG. 14 is a sectional view taken in the plane of line 14—14 of FIG. 13 illustrating the laminated sheet structure produced by the embodiment of the apparatus shown in FIG. 12.
FIG. 15 is a plan view of a flexible sheet illustrating a tear strip applied thereto in an undulating configuration.

With reference to FIG. 12, a schematic view of a modified form of apparatus is shown. As in the prior described apparatus, the tear strips 2 are drawn from spools 27, pass over feeder means in the form of a guide bar 28 and a plurality of spacer guides 29 and then over notched guide rod 31 of the type described previously. It should be noted, however, that the second notched guide rod 32 desirably is positioned on the side of extruder 33 opposite from the side illustrated in the embodiment of FIG. 8. That is, in the instant modification guide rod 32 is positioned above pressure roll 36 rather than above roll 34 as was the case in the embodiment of FIG. 8. In this manner, as is shown in the view of FIG. 13, the tear strips 2 are applied to the laminated sheet 1 on the extreme outer surface thereof. That is, a thin even coating of heat sealable material 13 is applied by extruder 33 directly to the outer surface of metallic foil web 11 and the tear strip 2 is then fed onto the outer surface of the heat sealable layer 13 so applied.

As rolls 34 and 36 draw the laminated and coated sheet 1 downwardly therebetween, pressure is applied to the sheet 1 and the heat sealable coating 13 is securely adhered thereto. At the same time, however, tear strips 2 are somewhat flattened by the pressure exerted by the rolls and are partially embedded or securely bonded in the outer surface of heat sealable layer 13. In this respect, it should be noted that, depending on the thickness of the heat sealable layer 13, the tear strip may be more or less buried in such layer. A sectional view of this modification of the tear strip bonded to the laminated sheet is shown in FIG. 14.

As mentioned previously, the guide rod 32 normally positions the plurality of tear strips 2 onto the moving laminated sheet so that such tear strips are applied to the sheet in a straight line. However, under certain situations it is desirable to apply tear strips to the sheet in undulating lines. For example, when the large sheet 1 is cut into sheets of less width by cutters 37 as described previously, each of such smaller sheets frequently includes only one tear strip located adjacent one edge thereof. Because the tear strip is adjacent an edge of such narrow sheets and because under certain situations the tear strip causes a bulge or projection along the length of the smaller sheet so formed a build-up of material is produced in the smaller rolls. Such build-up prevents a neat, uniformly coiled roll from being formed.

To preclude such build-up in the rolls of material in the area of the tear strip, it is desirable to attach notched guide rod 32 over which the tear strips 2 are fed to oscillating means which is capable of moving the guide rod 32 transversely of the direction of travel of the laminated sheet 1 passing therebeneath thereby causing the tear strips to be applied to the sheet in an undulating manner. Such oscillating means, as is illustrated in FIG. 12, desirably consists of a connecting rod 39 detachably secured to one end of the notched guide rod 32. Such connecting rod 39 is pivotally connected at its other end to a cam arm 41 which in turn is eccentrically connected to a cam wheel 42. Cam wheel 42 is rotated by any conventional means, such as motor 43.

It should be understood that upon rotation by motor 43 of cam wheel 42, to which cam arm 41 is eccentrically mounted, a transverse movement or oscillation of guide rod 32 across laminated sheet 1 is produced. In this manner, the relative position of each of the tear strips 2 applied to laminated sheet 1 may be modified and build-up in the rolls of the smaller width sheet cut therefrom may be substantially decreased or eliminated. The oscillating means described is only schematically illustrated but it should be understood that such means may be set for various degrees of oscillation and may be run at various speeds.

Because guide rod 32 has spaced notches in a surface thereof in which the tear strips slide, the tear strips are maintained in proper position during oscillation of the rod 32 by the oscillating mechanism. However, under certain situations it may be desirable to form guide rod 32 with holes therethrough or other similar structure, for insuring proper guiding of the tear strips during oscillation without disengagement of the strips from rod 32. Under normal conditions the amount of oscillation necessary to prevent build-up in the rolls is very slight, perhaps of a magnitude of only three to five times the diameter for the tear strip being applied to the laminated sheet. The degree of oscillation may be controlled by the size of the cam wheel 42 which is used as well as by the speed of rotation thereof. Such oscillation desirably is of such character that there is a substantial distance between adjacent crests of the undulated tear strips applied to the sheet by the oscillating means. That is, the magnitude of oscillation in one complete revolution of cam wheel 42 desirably is very slight. For example, the tear strips frequently used with a desirable embodiment of a pouch embodying this invention are of a diameter of the magnitude of three thousandths to five thousandths of an inch. When such small size tear strips are used, the magnitude of oscillation is desirably less than ⅛ of an inch per ten linear feet of the tear strip as applied to the laminated sheet. Under normal conditions, the magnitude of oscillation need not exceed ¼ to ½ inch per ten linear feet of tear strip to eliminate build-up in the coils of sheet material to which the tear strips are applied. Thus, although they do not cause build-up in the roll because of their slight undulations, the tear strips for all practical purposes extend in one substantially straight direction substantially parallel to the edges of the sheet, so that in the final pouches each tear strip is in substantially a straight line substantially parallel to an edge of the pouch.

However, under certain situations it may be desirable to apply a tear strip to a laminated sheet in an undulating manner of substantial proportions as is illustrated in FIG. 15. For example, if it is desired to form a pouch with a tear strip which will provide an irregular or ragged opening, by suitable adjustments of the oscillating means described previously and by varying the speed of rotation or size of cam wheel 42 the amount of oscillation may be varied so that a tear strip may be applied to a sheet in any manner and to any proportion desired. By properly regulating the amount of oscillation and undulation of the tear strip and the locality of undulation relative to the sheet it is possible to extend a tear strip across a corner of a pouch, to aid in opening only the corner thereof, and to have the remainder of the strip extend along an edge of the pouch.

Although the discussion thus far has related to one desirable form of pouch which may be made by utilizing the method and apparatus of this invention, it should be understood that numerous other modifications may be formed, a few of which are discussed hereinafter. In this respect, all of the modifications discussed herein previously are equally applicable to the pouch modifications to be discussed subsequently.

Figures 16, 17, 21:
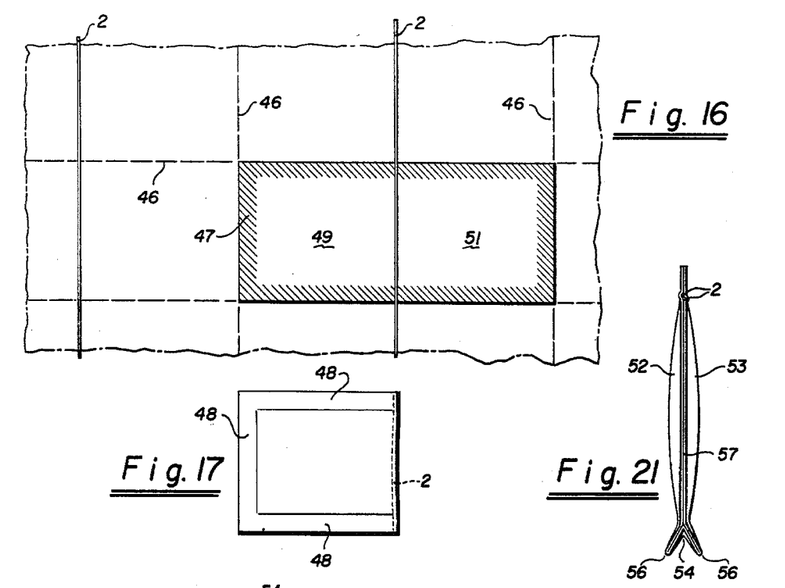
FIG. 16 is a plan view of a flexible sheet illustrating the manner in which a tear strip is applied thereto to produce another modification of a heat sealable pouch.
FIG. 17 is a plan view of a modification of a sealed pouch formed from the sheet of FIG. 16.
FIG. 21 is a side view of the modification of the pouch shown in FIG. 19 filled with material and heat sealed.

FIGS. 16 and 17 illustrate another embodiment of a pouch which may be manufactured by utilizing the method and apparatus of this invention. As illustrated in FIG. 16 a plurality of tear strips 2 may be applied in substantially parallel fashion to a laminated sheet in the manner described previously. In such arrangement, each of the tear strips 2 is positioned to extend along the middle of the individual blanks which subsequently are cut from the sheet and are utilized to form individual pouches. The shaded area 47 in FIG. 16, and subsequent figures, not only sets out the boundaries of a single blank which is to be cut from a parent sheet for forming a single pouch but also indicates the surfaces of such blank which are brought into face-to-face contact and sealed together to form fin type seams of the type mentioned previously. Furthermore, as used hereinafter, the term fold line applies to lines along which individual blanks are folded to form pouches but such lines need not be impressed physically into the parent sheet.

As illustrated in FIG. 16, a plurality of longitudinally and transversely extending lines 46 are indicated which illustrate the manner in which a laminated sheet is to be cut to provide a plurality of separate blanks each of which is intended for forming a single pouch. Lines 46 are not actually formed or impressed in the sheet but are merely illustrative of the manner in which an enlarged sheet is cut into separate blanks. The area indicated by the shading 47 in FIG. 16 sets out a single heat sealable blank which is folded, after being cut from the sheet, to the folded and doubled over condition shown in FIG. 17. Such blank is heat sealed in any conventional manner along three edges thereof to provide three fin type seams 18, each of which extends a substantial distance inwardly from an outer extremity of the pouch.

In this embodiment of the invention, the tear strip 2 originally extends centrally of the blank set out by the shading 47 thereby forming adjacent panels 49 and 51 hingedly connected beneath tear strip 2. After the blank is folded, tear strip 2 extends along the folded edge which is produced as the two walls 49 and 51 of the blank are folded into overlying relationship and heat sealed in such relationship. It should be noted that the tear strip 2 extends along the entire length of the edge of the pouch and terminates with its ends flush with opposite extremities of the pouch. The pouch of FIG. 17 may be opened merely by grasping one corner of the appropriate fin 48, as described previously, and pulling downwardly on such portion. Because opposite end portions of tear strip 2 are securely clamped between the walls of opposite fins 48 tearing of a corner of either of such fins results in pulling the tears strip therewith.

Figure 18:
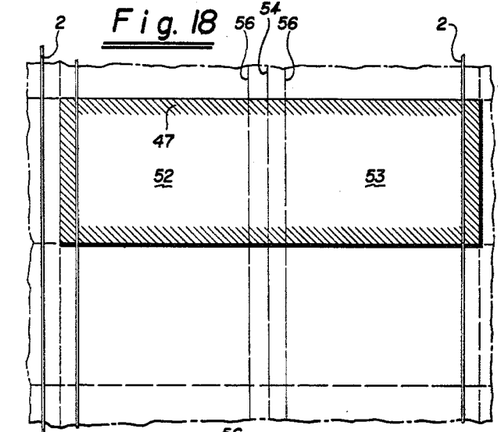
FIG. 18 is a plan view of a flexible sheet illustrating another modification in the application of tear strips to a sheet to provide a heat sealable pouch.

In FIG. 18, a plurality of substantially parallel tear strips 2 are applied to a laminated sheet in the manner described previously and a plurality of blanks, each of the type and size set out by the shaded areas 47, are produced. It should be noted that with respect to this modification, two tear strips desirable are utilized in forming each pouch with each tear strip being positioned adjacent an outer edge of the pouch. Each blank consists of two panels 52 and 53 which are interconnected along a fold line 54. When the pouch is completely formed and sealed, panels 52 and 53 are folded to overlie each other with each of the tear strips being substantially in the same plane.

Figure 19:
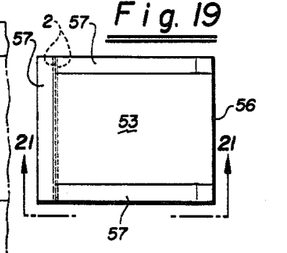
FIG. 19 is a plan view of a heat sealed pouch of the type formed from the sheet of FIG. 18.
Figure 20:
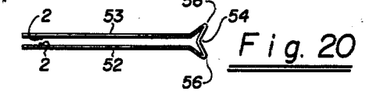
FIG. 20 is an end view of a portion of the sheet of FIG. 18 illustrating the manner in which such portion is folded to form the pouch of FIG. 19.

The pouch of FIGS. 19 and 21 is formed with a gusset bottom by folding the blank in one direction along the central fold line 54 to produce opposite halves of the gusset, which opposite halves are subsequently reversely folded along additional fold lines 56 to the position shown in FIG. 20. In this manner, the pouch so formed includes two V-shaped extensions which cooperate to produce the gusset bottom described.

As illustrated in FIG. 19, after the gusset bottom has been formed and the pouch has been filled the pouch is heat sealed along three margins thereof to provide fin type seams 57. It should be understood, however, that the gusset bottom of such pouch only is heat sealed at its transverse opposite extremities. That is, the two halves of the gusset are free to receive material contained in the pouch in that such gusset halves are sealed only to the extent illustrated in FIG. 19 by fin seams 57 extending inwardly from opposite margins of the pouch. As shown in FIG. 21, each half of the gusset bottom is heat sealed only along its side edge to preclude escape of material therethrough.

In this modification, overlapping tear strips 2 extend along the fin type seam 57 remote from the gusset bottom. Because the seam 57 extends inwardly from an edge of the pouch, the tear strips similarly are spaced inwardly from such edge. In such modification, it is merely necessary to grasp the appropriate seam 57 and to pull down thereon to open the pouch. By using two overlapping tear strips, proper opening of the gusset type pouch is insured regardless of which direction the tear strip is pulled or from which extremity opening of pouch is started. It should be noted that the end portions of each of the tear strips are securely clamped between the walls of opposite fin seams 57.

Although two tear strips have been shown which overlie and contact each other in this pouch modification, it should be understood that under certain situations one tear strip would be enough. Two tear strips are more desirable, however, for the reasons mentioned previously.

Figure 22:
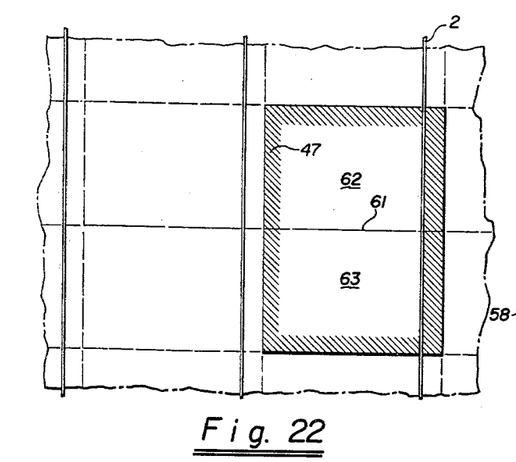
FIG. 22 is a plan view of a further modification of a sheet of material for forming another modification of a heat sealable pouch.
Figure 23:
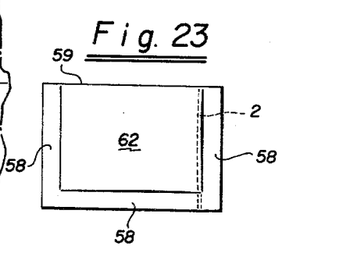
FIG. 23 is a plan view of a sealed pouch formed from the sheet of FIG. 22.

FIGS. 22 and 23 show a further modification of a pouch embodying this invention. Such pouch is produced from a blank of the type illustrated in FIG. 22 which consists of hingedly connected panels 62 and 63. The sealed pouch shown in FIG. 23 has three fin type seams 58 of the type discussed previously extending inwardly from three margins or extremities of the pouch, while the fourth margin consists of a folded edge 59. Such folded edge 59 is formed when the blank outlined by the shading 47 in FIG. 22 is folded along line 61 thereby bringing panels 62 and 63 into overlying face-to-face relationship.

It should be noted that tear strip 2 in this modification runs in a direction adjacent one of the fin type seams 58 and is spaced inwardly from an edge of the pouch. Because the blank is folded along line 61, the tear strip is doubled back up itself in the finished sealed pouch. In this manner the tear strip, while it is one continuous length, has both ends thereof embedded in the same fin type seam 58 while the intermediate portion of the tear strip extends in overlapping loop form to provide doubled back means for opening the pouch in the manner described previously.

This pouch differs from the pouches previously described in that both end portions of the tear strip are clamped in the same fin type seam 58 thereby providing a double thickness strip. The extremity of such double thickness strip opposite the clamped end portions is merely a bend or loop in the doubled back tear strip. However, because the strip is bonded throughout its length to the blank from which the pouch is produced, such strip cannot pull loose from the completed pouch as such pouch is opened. This pouch is more easily opened by tearing initially through fin 58 rather than attempting to tear along folded edge 59.

Figures 24, 25:
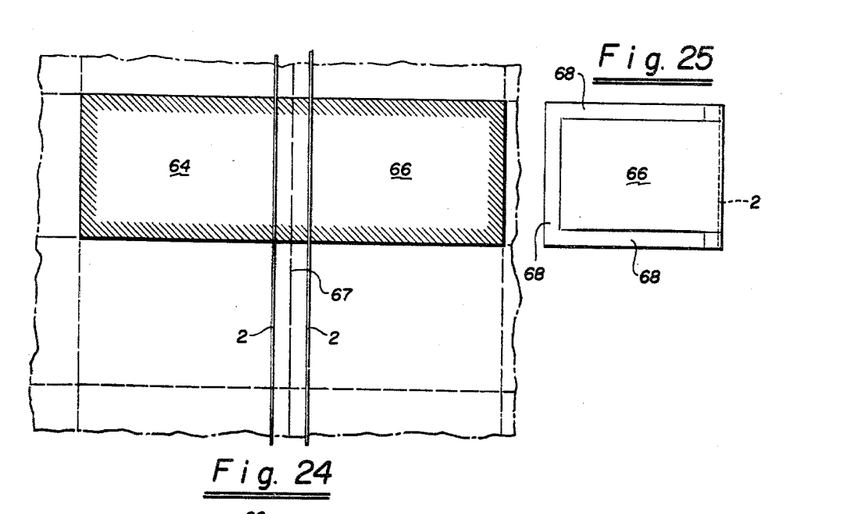
FIG. 24 is a plan view of a flexible sheet having tear strips applied thereto to form yet another modification of a heat sealable pouch.
FIG. 25 is a plan view of a sealed pouch formed from the sheet of FIG. 24.
Figure 26:
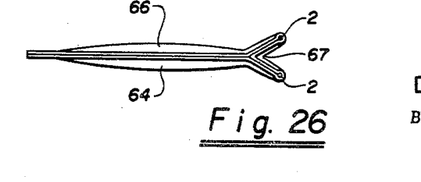
FIG. 26 is an end view of the sealed pouch of FIG. 25.

FIGS. 24 to 26 illustrate a further embodiment of a pouch of this invention which is similar to the gusset type pouch of FIGS. 18 to 21, discussed previously. In FIG. 24 a blank is shown on which two tear strips have been positioned substantially parallel and close to each other. The blank illustrated includes two adjacent panels 64 and 66 interconnected along fold line 67. One of the tear strips 2 is positioned on each side of fold line 67. The blank of FIG. 24 is folded in the manner described previously to provide a gusset-type pouch of the type shown in FIG. 26 which is similar to the pouch illustrated in FIG. 21. In the instant modification, however, a tear strip 2 is positioned in each half of the gusset bottom of the pouch. As illustrated in FIG. 25 the pouch is heat sealed along three adjacent edges thereof providing three fin type seams 68. To open such pouch, it is merely necessary to grasp one or both of the gusset halves and to tear the same in a manner described previously. A pouch of this type has the advantage that the entire bottom need not be torn but if so desired, only a single gusset may be removed.

Because the gusseted bottom of the pouch is not closed from the body thereof, the contents may be removed through the torn gusset. It should be understood that although two tear strips have been illustrated in the embodiment shown in FIGS. 24 to 26, a single tear strip could be utilized if desired. In such case, however, a tear strip would be positioned in only one half of the gusset bottom shown. Gusset pouches of the type herein described are desirable in that the gusset halves thereof may be spread apart and utilized to stand a filled pouch on end for display purposes and the like.

A further embodiment of a heat sealable pouch consists of four heat sealable fins extending inwardly from each of the four extremities of the pouch. Such pouch may be made from one or two pieces of material brought into face-to-face relationship and heat sealed along all four extremities thereof. In such a pouch, a double string most often would be utilized but a single string also would suffice for opening the pouch.

As mentioned previously all of the described pouch modifications desirably are of comparatively small size for the reception of powdery materials such as cocoa and the like. In general, the size of such pouches varies from three to four inches in width and from five to six inches in length. In such pouches, it has been found that laminated sheet material approximately five thousandths of an inch in thickness is adequate to properly protect the contents of the pouch. In the foil and paper laminated sheet described, the paper web is approximately two-thousandths of an inch thick. The laminating media, such as polyethylene, has a thickness of approximately one mil, as does the foil web and the heat sealable coating applied to the exposed surface of the foil web.

The tear strip used with pouches of the size described may vary in size from three to five thousandths of an inch in diameter. When a tear strip of the smaller diameter is used, such strip is flattened sufficiently and is partially embedded in the laminated sheet so that there is substantially no bulge in the area of the tear strip in such sheet. However, when a tear strip of approximately five thousandths of an inch in diameter is used, a bulge or protrusion of the order of one to two thousandths of an inch may result in the sheet. That is, in the area of the tear strip bulge, the laminated sheet may have a thickness of about six to seven thousandths of an inch. In such case, the oscillating means shown in FIG. 12 is utilized to compensate for the build up in the rolls after the tear strip has been applied to the laminated sheet.

While the tear strip has been described as being desirably circular in cross-section, as shown in FIGS. 3, 5 and 6, and as being flattened under certain conditions, as shown in FIGS. 11 and 14, it should be understood that under other conditions a flat tear strip having a rectangular or other polygonal cross-section could be utilized if so desired. Such flat tear strip would minimize the amount of build up produced in a roll of sheet material. Furthermore, the tear strip under certain situations may be a fine metallic cord or wire. A wire tear strip may be desirable when a tear strip of high strength is required to tear certain tough materials from which the pouch is produced.

While it has been described as being desirable to utilize tear strips in pouches of comparatively small size, it should be understood that the concept of this invention is sufficiently broad so that tear strips may be incorporated with bags or the like of substantial size, such as the type for receiving many pounds of rather bulky and heavy material, such as potatoes and the like. In such case, stronger material than laminated sheets of paper and foil would be utilized and certain commercially available strong and tough plastic films may be utilized. The plastic material of the type generally known as "Mylar" would fall in such group. When such plastic materials are used to form pouches, it is necessary in most instances to coat the inner surface of such pouches with a heat sealable material, such as polyethylene, in the manner described herein previously, to impart heat sealable properties thereto. When such tough plastic materials are used to form bags or pouches, a relatively strong thin tear strip, such as metallic wire, may be utilized. Furthermore, because of the strength of such plastic films, a nick or notch frequently is utilized adjacent one end of the tear strip to facilitate initial tearing of the plastic material.

It also should be understood that although in the embodiments described herein the heat sealable coating of polyethylene has been described as being extruded onto a surface of the laminated sheet, under certain situations it may be desirable to apply a separate sheet or web of preformed heat sealable material to the laminated sheet and secure the same thereto by using any appropriate adhesive.

It is also contemplated that certain lacquer or resin coatings may be applied to a surface of a sheet of paper or other like sheet material. Such lacquer or resin coatings are thermo-plastic and impart heat sealing characteristics to such coated sheet. Such lacquers or resins generally are applied in liquid form and penetrate to a degree the parent web or sheet of material to which such coating is applied. Such lacquer or resin coatings also may be applied to laminated foil sheets of the type described herein previously.

It is desirable under certain conditions to use lacquer or resin coatings as a heat sealable material in that such coatings remain hard and firm at higher temperatures than do coatings of other materials, such as polyethylene. As a result, the package seams formed during the heat sealing operation remain leak-proof to higher temperatures and packages formed from such material may be immersed in boiling water and the like to heat the contents of the package without the seams becoming loose.

In all the modifications of the heat sealable pouch described previously, it should be understood that the tear strips bonded to each of the pouches terminates with each of its ends substantialy flush with the opposite extremities of the pouch to which it is bonded. Such flush tear strip structure results from the manner in which the pouches are made from a parent sheet of material in that blanks for individual pouches are cut from a large parent sheet during the manufacturing process. During such cutting the tear strips are cut off flush with the ends of the blank which subsequently make up the extremities of the finished pouch.

It should be understood that the foregoing description is merely illustrative of certain desirable embodiments of pouches of this invention and the apparatus and method of making the same. Other modifications may become apparent after studying this disclosure to one skilled in the art. This disclosure, however, is not intended to be limiting on the invention and the scope thereof should be determined solely in light of the appended claims.

I claim:

1. Apparatus for applying a coating of heat sealable material and a plurality of spaced elongated cords to a flexible sheet comprising means for applying a uniform layer of flowable heat sealable material to said sheet for substantially its full length and width, supply means for feeding said sheet past said coating means, additional supply means for feeding a plurality of continuous cords in laterally spaced relationship into contact with said sheet adjacent said coating means, oscillating means for changing the position of said cords relative to said sheet whereby said cords may be applied in an undulating manner to said sheet, said oscillating means precluding projection of all said cords beyond the lateral marginal confines of said sheet, and means adjacent said coating means for applying pressure to said coated sheet to secure said cords to said sheet and to adhere said coating to said sheet throughout the length thereof.

2. Apparatus for simultaneously applying a plurality of laterally spaced tear strips to a wide sheet of flexible material to be used when cut into narrower sheets in forming easy opening heat sealable pouches each of which has a tear strip along an edge thereof, comprising supply means for a web of flexible sheet material to which said tear strips are to be applied in spaced relationship, supply means for a plurality of continuous lengths of said tear strips, supply means for a quantity of heat flowable moisture resistant heat sealable material to be applied to said web along the full length and width thereof, means for moving said web without interruption past a predetermined location, means for feeding said plurality of lengths of tear strips in laterally spaced relationship to said predetermined location, means for applying a viscous settable layer of said moisture resistant material to said web as said web is moved past said location while simultaneously applying said lengths of tear strips thereto in laterally spaced relationship, pressure means adjacent said predetermined location for applying pressure to said web, said layer of moisture resistant material and said spaced tear strips to insure secure bonding thereof together, and slitting means for separating said web into a plurality of narrower sheets each of which includes a tear strip for the full length thereof.

3. Apparatus for simultaneously applying a plurality of laterally spaced tear strips to a wide sheet of flexible material to be used when cut into narrower sheets in forming easy opening heat sealable pouches each of which has a tear strip along an edge thereof, comprising supply means for a web of flexible sheet material to which said tear strips are to be applied in spaced relationship, supply means for a plurality of continuous lengths of said tear strips, supply means for a quantity of heat flowable moisture resistant heat sealable material to be applied to said web along the full length and width thereof, means for moving said web without interruption past a predetermined location, means for feeding said plurality of lengths of tear strips in laterally spaced relationship to said predetermined location, means for applying a viscous settable layer of said moisture resistant material to said web as said web is moved past said location while simultaneously applying said lengths of tear strips thereto in laterally spaced relationship, pressure means adjacent said predetermined location for applying pressure to said web, said layer of moisture resistant material and said spaced tear strips to insure secure bonding thereof together, and means for oscillating said tear strips in unison as said tear strips are applied to said web.

4. A method of making pouch forming stock with a tear strip for individual heat sealable pouches to be cut from such stock comprising providing a supply of tear strips; providing a web of flexible material; providing a supply of flowable heat sealable moisture resistant material; moving said web without interruption past said supply of heat sealable material; effecting flow of said heat sealable material onto a surface of said web to provide a continuous heat sealable layer on said web; applying a plurality of said tear strips in spaced apart relationship to said web only in one substantially straight direction substantially parallel to the edges of said web and within the lateral marginal confines thereof, while said heat sealable material is flowed onto said web; said tear strips being spaced apart in such predetermined relationship as to provide a plurality of narrower sheet sections each of which includes at least one tear strip extending only in said direction and from which heat sealable pouches can be formed after separating said sheet sections by cutting said web longitudinally; and simultaneously pressing said web, layer of heat sealable material and tear strips together to securely bond said tear strips to said web for the full length thereof.

5. A method of making pouch forming stock with a tear strip for individual heat sealable pouches comprising providing a supply of tear strips; providing a web of flexible material; continuously moving said web of flexible material past a source of flowable heat sealable moisture resistant material; effecting flow of said heat sealable material onto at least one surface of said web to provide a continuous heat sealable layer on said web; applying a plurality of said tear strips in spaced apart relationship to said web in only one substantially straight direction substantially parallel to the edges of said web and within the lateral marginal confines thereof, while said heat sealable material is flowed onto said web; simultaneously pressing said web, layer of heat sealable material and tear strips together to securely bond said tear strips to said web for the full length thereof; and slitting said web into a plurality of narrower sheets each of which includes at least one tear strip extending only in said direction for the manufacture of individual heat sealable pouches from the respective narrower sheets.

6. The method of claim 5 wherein the tear strips are applied with slight undulations to preclude roll build-up.

7. A method of making heat sealable pouch type food containers and the like each with a tear strip comprising providing a sheet of flexible material, applying a layer of heat sealable moisture resistant material to said sheet for substantially its full length and width, applying a plurality of elongated tear strips in spaced apart relationship to said sheet in a substantially straight direction only along the length thereof and bonding the same to said sheet with said layer, maintaining the tear strips thus applied to said sheet within the lateral marginal confines of said sheet, slitting said sheet longitudinally into a plurality of narrower sheets each of which includes at least one tear strip extending only in said direction, transversely cutting each of said narrower sheets including said layer and tear strip secured thereto into a plurality of blanks each of which is of a size intended to form a container and each of which includes a tear strip extending from end to end thereof within the lateral marginal confines thereof, and forming each of the blanks so cut into a generally flat container comprising an inner heat sealable moisture resistant surface and a tear strip, said tear strip extending uninterruptedly between opposite margins of each of the containers so formed along an edge thereof.

8. A method of making heat sealable flat food pouches and the like each with a tear strip, comprising providing an elongated sheet of flexible material, continuously applying a flowable coating of heat sealable material to at least one surface of said sheet for substantially its full length and width, simultaneously feeding a plurality of continuous tear strips in spaced apart relationship into contact with said coated sheet in a substantially straight direction only along the length thereof, applying pressure to said coated sheet to insure adherence of said coating to said sheet with said tear strips securely bonded to said coating throughout the length of said sheet, slitting said sheet longitudinally into a plurality of narrower sheets each of which includes at least one tear strip extending only in said direction, transversely cutting each of said coated narrower sheets into blanks each of which has a coated surface and a tear strip section which extends from end to end within the lateral marginal confines thereof with opposite ends of such tear strip section flush with opposite margins of each blank, and forming each of said blanks into generally flat pouches each of which has a tear strip extending uninterruptedly in the direction of an edge the full length thereof.

References Cited by the Examiner
UNITED STATES PATENTS

| | | | |
|---|---|---|---|
| 1,299,237 | 4/19 | Scherf | 156—436 |
| 2,189,347 | 2/40 | Martin | 93—1 |
| 2,290,386 | 7/42 | Schindler | 156—436 X |
| 2,353,746 | 7/44 | Moore | 93—1 |
| 2,456,923 | 12/48 | Cogovan et al. | 156—436 |
| 2,786,510 | 3/57 | Humphner | 156—176 |

FRANK E. BAILEY, *Primary Examiner.*